(12) United States Patent  
Budd et al.

(10) Patent No.: US 7,403,944 B2  
(45) Date of Patent: Jul. 22, 2008

(54) REDUCED COMPARISON COORDINATE-VALUE SORTING PROCESS

(76) Inventors: Gerald Budd, PMB 250, Edmonds, WA (US) 98026; Keith Sonnanburg, 10924 Mukilteo Speedway, #274, Mukilteo, WA (US) 98275

( * ) Notice: Subject to any disclaimer, the term of this patent is extended or adjusted under 35 U.S.C. 154(b) by 367 days.

(21) Appl. No.: 10/418,918

(22) Filed: Apr. 21, 2003

(65) Prior Publication Data

US 2004/0210596 A1    Oct. 21, 2004

(51) Int. Cl.  
*G06F 7/00* (2006.01)

(52) U.S. Cl. .......................................... 707/7
(58) Field of Classification Search ...................... 707/7  
See application file for complete search history.

*Primary Examiner*—Cheyne D Ly (57) ABSTRACT

One objective of the present invention is to optimize a sorting process (20) that, by novel means (240), reduces the number of comparisons required to sort delivered items (10, 230) whether said items are physical tokens, electronic data or other symbolic representations of whatever is sorted. Said novel means (240) include: initializing values (220), recording values (250), comparing items found closest to evolving centroids (310, 320), restricting evolving fields for comparison within limits (330), setting pointers indicating the sorted order of items (360), detecting delivered items and those remaining within limits (60, 260), noting value changes (30, 250), and appropriate recursions (270, 280, 350, 370). A second objective of the present invention is to provide computer software means for said process (20) whereby said novel means (240) can be operably coupled with an apparatus to find items (40) and place them in ordered queues (50) as items (70).

20 Claims, 4 Drawing Sheets

REDUCED COMPARISON COORDINATE-VALUE SORTING PROCESS

CROSS-REFERENCE TO RELATED APPLICATIONS

Not Applicable

STATEMENT REGARDING FEDERALLY SPONSORED RESEARCH

Not Applicable

SEQUENCE LISTING, A TABLE OR A COMPUTER PROGRAM

Not Applicable

BACKGROUND

The present invention relates to a process of sorting items comprising physical tokens, electronic data, or other symbols representing such tokens.

In particular, the invention relates to a method and to software for sorting mail or similar items that are themselves to be ordered (e.g., envelopes, cards, other flats, inventory items, chemical samples, or machine parts), or for sorting items that symbolically represent any other possible referents to be sorted (i.e., some useful code or index, such as the postal zip code; employed for achieving a tangible result, e.g., sorted mail).

There is no known prior art pertaining to the present inventive process.

All previously known sorting procedures that involve comparing items a fixed number of times asymptotically approach an ideal of N lg N comparisons known as the information theoretic lower bound.

In contrast, the maximum number of comparisons the present invention requires is always less than the minimum number of comparisons necessary to complete a sorting process by any of such preceding means, regardless of input ordering or the number of items; hence, greater than one (1) bit of information is gleaned from successive comparisons made via the invention's operation, thus the rate of information growth accelerates with iteration.

As a consequence, the advantage afforded by the invention grows larger as the number of items to sort grows larger.

Interpolation is commonly used to determine values between established X-axis values when a function $y=f(x)$, having only discrete values, is approximated via polynomial expressions.

A related problem is that of taking function values at lattice points as "exact" within some confidence intervals of accuracy, in order to manage the "roughening" effect of differentiation.

When using a difference procedure to enable such approximations, a finite set of discrete points is treated as analogous to a plane.

The Laplace operator based on a square lattice incorporates five-point "molecules," wherein the boundary conditions for a specially selected position are the lattice lines and the boundary values are given at the boundary points of the lattice.

The invention makes use of similar "molecules" to locate the most central positions in spatial arrays of placed items; hence, the inventive process is understood as one that makes use of "topological interpolation."

In order to sort items, the present invention introduces a novel interpretation of plural axes defining a spatial array and a novel use for the elements of said spatial array.

Many methods and systems for sorting electronic data or other symbols using computer systems, comprising hardware and software, are known.

Sorting is used to collect similar items, to efficiently match lists of items and to facilitate the retrieval of information.

Sorting is at the heart of prioritizing queues, bringing order to haphazardly collected data, comparing quantities, optimizing routes, managing large databases, and other embodiments that are useful and pervasive in our complex society.

Knuth in *The Art of Computer Programming, Volume 3: Sorting and Searching*, $2^{nd}$ Edition, 1998, estimated that in some computer installations as much as 50% of computer run time was consumed by sorting tasks.

Some examples of sorting processes in computerized applications are described in the following U.S. patents:

U.S. Pat. No. 2,984,822 issued on May 16, 1961 to Armstrong et al describes a system for comparing and sorting character data and an apparatus for directing character data stored in two record blocks to appropriate high and low lines as determined by the relative magnitude of the character data, and the compare-sort units can then be used in cascade.

U.S. Pat. No. 3,029,413 issued on Apr. 10, 1962 to O'Conner et al describes electronic switching circuits and magnetic storage means used to sort randomly arranged information according to a desired sequence.

U.S. Pat. No. 3,273,127 issued on Sep. 13, 1966 to Armstrong describes a digital sorting system and a network capable of comparing the identifying multi-bit binary signal of the record about to be fed into the system with the identifying numbers of the sequenced records already in the system, and the sorting network also rearranges the new record with respect to the previously sequenced records so that the new record may be sorted into its proper place in the sequence.

U.S. Pat. No. 3,418,632 issued on Dec. 24, 1968 to Batcher describes basic merging components used in substantially equally divided subdivisions to effect a merge of two sequences of data each arranged in ascending order, and the resultant output is automatically integrated into a single arranged sequence.

U.S. Pat. No. 3,685,024 issued on Aug. 15, 1972 to O'Conner describes a plurality of sorting switches used to perform a satisfactory partial sort when target positions change slowly, relative to the frequency of sorting.

U.S. Pat. No. 4,445,171 issued on Apr. 24, 1984 to Neches describes a multiprocessor system that sorts data content messages having a common priority in order to distribute them to processors consistent with a total network delay time and routing is determined by local acceptance or rejection of the messages at the processors, based upon destination data in the messages.

U.S. Pat. No. 4,510,567 issued on Apr. 9, 1985 to Chang et al describes a method of sorting data on a disk file by transferring records to a sort buffer, on the basis of rank, according to qualifying criteria.

U.S. Pat. No. 4,628,483 issued on Dec. 9, 1986 to Nelson describes a sorting network that simultaneously uses multiple comparators to sort the keys of N records.

U.S. Pat. No. 4,693,373 issued on Sep. 15, 1987 to Lamb et al describes a computer-controlled sorter, loader and archiving system for slides that relies on accession numbers and sorting logic to direct slides to appropriate bins or compartments.

Some examples of reducing search spaces during data processing are described in the following U.S. patents:

U.S. Pat. No. 6,385,765 issued on May 7, 2002 to Cleaveland et al describes software and methods of using a computer for specifying and verifying synchronous and asynchronous systems and that further uses a "new kind of partial-order reduction method."

U.S. Pat. No. 6,513,031 issued on Jan. 23, 2003 to Fries et al describes a method of aiding searches in a computer environment by selecting a search area based upon accessing a user profile and upon the search query.

U.S. Pat. No. 6,523,030 issued on Feb. 18, 2003 to Horowitz describes a method for operating a computer system to minimize the number of disk storage access operations required for creating the inverted database from a series of inverted databases; and the database is divided into several smaller databases, then postings lists created for each subdatabase are sorted and common and non-common terms are merged.

Many methods and machines for sorting articles are known.

Modern item sorting practice, especially sorting practice for items of mail, is based on the use of sorting machines.

Some examples of apparatus and methods for mail sorting are described in the following U.S. patents:

U.S. Pat. No. 4,247,008 issued on Jan. 27, 1981 to Dobbs describes a microprocessor implemented method and system for use in a mail sorting machine that also compiles a list of zip codes from each envelope that moves through the machine.

U.S. Pat. No. 5,667,078 issued on Sep. 16, 1997 to Walach describes an apparatus and method for mail sorting, including:

1) generating a first sequence number for each subset of mail;

2) sorting the first subset into batches according to the first sequence number;

3) associating one of the first sequence numbers corresponding to the destination addresses of the mail items in the first subset into batches, according to the second and first sequence numbers, while disregarding N of the most significant digits of the first sequence number;

4) interleaving the batches from the first and the second subset; and 5) sorting according to the N most significant digits of the first sequence number, and the method is intended to allow porting of the mail to begin prior to all the mail being physically present at the sorter.

U.S. Pat. No. 6,073,060 issued on Jun. 6, 2000 to Robinson describes a sorting station that translates scanned signals into internal addresses that correspond to bins and the bins correspond to postal routes.

U.S. Pat. No. 6,259,964 issued on Jul. 10, 2001 to Robinson describes a sorting station that translates scanned signals into internal addresses that correspond to bins.

U.S. Pat. No. 6,274,836 issued on Aug. 14, 2001 to Walach describes a sorting machine with multiple input bins associated with multiple output bins that allows the subsequent grouping of sorted articles for resorting; thus, the first and second portions of a sorting key may be disjoint.

All of the references cited herein rely on well-known methods for sorting and do not partake of the novel processes introduced by the invention.

Although the inventive process makes use of certain techniques similar to those well known in the art of sorting items, it also departs significantly from all known methods, software, and systems that precede it.

Since the inventive process is substantively unlike known conventional methods for sorting, it thereby yields distinct, useful and tangible advantages.

Other methods used for sorting items rely on comparisons of all items to all others, on arbitrarily reducing the field for comparisons, or on a logarithmically basal index assigned to each item.

Unlike these, the present invention reduces the fields for comparisons made based on simple differences among prioritized values assigned to the items compared.

This results in significant advantages on all measures of performance (i.e., the number of required comparisons, the number of required moves, and the time necessary to complete processing when the number of items to sort is not insignificantly small).

Although the invention includes features similar to methods belonging to the general category of an insertion sort, it is novel since the way items are placed defies the limits of the information theoretic lower bound.

Unlike an exchange sort, items sorted via the inventive process are never found to be out of order and so are not interchanged.

Continuous movement of items, as required by an exchange sort, is not necessary while items are being sorted.

Unlike a selection sort, items are not repeatedly searched for those next in order during item placement.

Unlike an enumeration sort, each item does not have to be compared with each of the other items, but instead only with a reduced subset of items already positioned.

Unlike a special-purpose sort defined for specific small groups of items, the inventive process readily generalizes to large numbers of items.

Whereas all previously known sorting procedures have relative strengths and weaknesses dependent on the intended application, the invention does not lose its advantage of minimizing comparisons due to the distribution of the items sorted, nor according to the mechanisms supporting its implementation.

Similar to address table sorting, where link addresses point to successive item locations, the invention creates link addresses that are ordered before rearranging items.

As with keysorting, a unique value is placed with the link addresses for greater speed.

Like with list sorting, an auxiliary link field is included in each record and, for the final result, records are linked in a list of links pointing to the records that follow them.

Unlike address calculation sorting, that merely estimates the general position of each item to accelerate its final placement, the invention fixes the final relative position for each item through a calculated (not random) convergent process.

The number of comparisons among data and the number of data movements necessary are thereby reliably reduced, and generally to a greater extent.

In order to reduce the time required for sorting, Batcher's parallel method performs all indicated comparisons and exchanges by using parallel operations.

Sorting is completed in $\frac{1}{2}[\lg N]([\lg N]+1)$ time-steps (e.g., 55 parallel steps for 1024 items to sort).

Whereas the present invention is not governed by the information theoretic lower bound with respect to each item compared, all other methods are so limited.

Without parallel means, to sort N items, the inventive process requires a maximum number of comparisons equal to the series sum for N terms of $([\lg N]+1)$.

However, once parallel processes are applied to the inventive process, time-steps are saved as well.

The relative positioning of one of plural items can be underway while the search for the position of the next item is initiated.

Thereby, idle areas in the search space, with respect to one path of comparisons, are employed via parallel processing for another path of comparisons, not engaged by the first path; thus, parallel processing in distinct sections of the whole problem space can occur simultaneously.

In the event that plural sequentially ordered items are routed to adjacent regions of space, the final position of one item may be contingent on the final placement of the other.

Even under such conditions, the returned value of the first item placed need not propagate all the way to the root of the search tree.

By employing parallel processes, not precluding serial processing at some stages of operation, the inventive process requirements will approach [lg N]+1 or fewer steps to sort N items, a significant savings.

Radix sorting, also known as distribution sorting, eliminates the need to compare keys directly by representing the keys as b-bit integers.

Sorting proceeds linearly through the entire sorting key associated with each item, in the direction implied by the choice of the beginning digit depends on whether the least or most significant digit is the first chosen.

The keys are sorted one digit at a time and then permuted to their respective locations.

Nonetheless, the radix method of sorting requires many steps, wherein every item or associated key is moved multiple times (a function of the number of digits required for a key to accommodate the number of distinct sorting codes desired).

In general, moving items is more time-consuming than comparing items.

One embodiment of the present invention requires no movement of items, instead pointers are set by comparing N items to be sorted.

In this case, the inventive process establishes a sequential path by following links from one item to another in the sorted order.

None of the applications important for sorting:
collecting items with similar features into sets;
matching items in two or more files; and
searching for information by key values, depend on sorting anything beyond data.

Data is categorized by common features, prioritized for the purpose of facilitating the logical combination of data from different fields, and then retrieved according to variously ordered indices.

The invention can be used to advantage in the above data-oriented application areas.

In addition, the invention can be used to sort physical tokens, method or system instructions, storage addresses, or transmission and transportation paths.

This means that inventory tracking, the distribution of goods, traffic direction, routing for delivery vehicles, path allocation, computer-aided software engineering, search processes, communication network routing, and applications for pattern recognition processes that lead to tangible outcomes are among the applications that can all benefit from diverse embodiments of the invention.

Unlike other sorting methods that rely solely on virtual representations in order to reduce the number of moves required to complete a sorting, the invention can sort real items in real space and time, therefore the invention can be readily applied to sorting physical tokens with no loss of its relative performance efficiency.

Since anything can be sorted using the invention, customized orderings that have no established a priori sequences are possible.

Concurrent sortings of real-time changing priorities can thus be applied to critical path management.

All publications, including patent documents and texts, referred to in this application are incorporated by reference in their entirety for all purposes to the same extent as if each individual publication were individually incorporated by reference.

SUMMARY

The invention is a method that can also readily be embodied as a machine, whether software or apparatus, whereby any number of any types of items, whether virtual or real, can be sorted into order with a minimal number of necessary comparisons made.

In other words, the maximum number of comparisons the present invention requires is always less than the minimum number of comparisons necessary to accomplish a completed sorting process by any current standard means, regardless of the input ordering.

One novel feature of the invention is the way in which search spaces are collapsed to minimize the number of comparisons required for sorting items.

The invention enables a more efficient sorting procedure than any previously known.

BRIEF DESCRIPTION OF THE DRAWINGS

The present invention will be understood and appreciated more fully from the following detailed description, taken in conjunction with the drawings in which.

REFERENCE NUMERALS IN DRAWINGS

Figure 1:
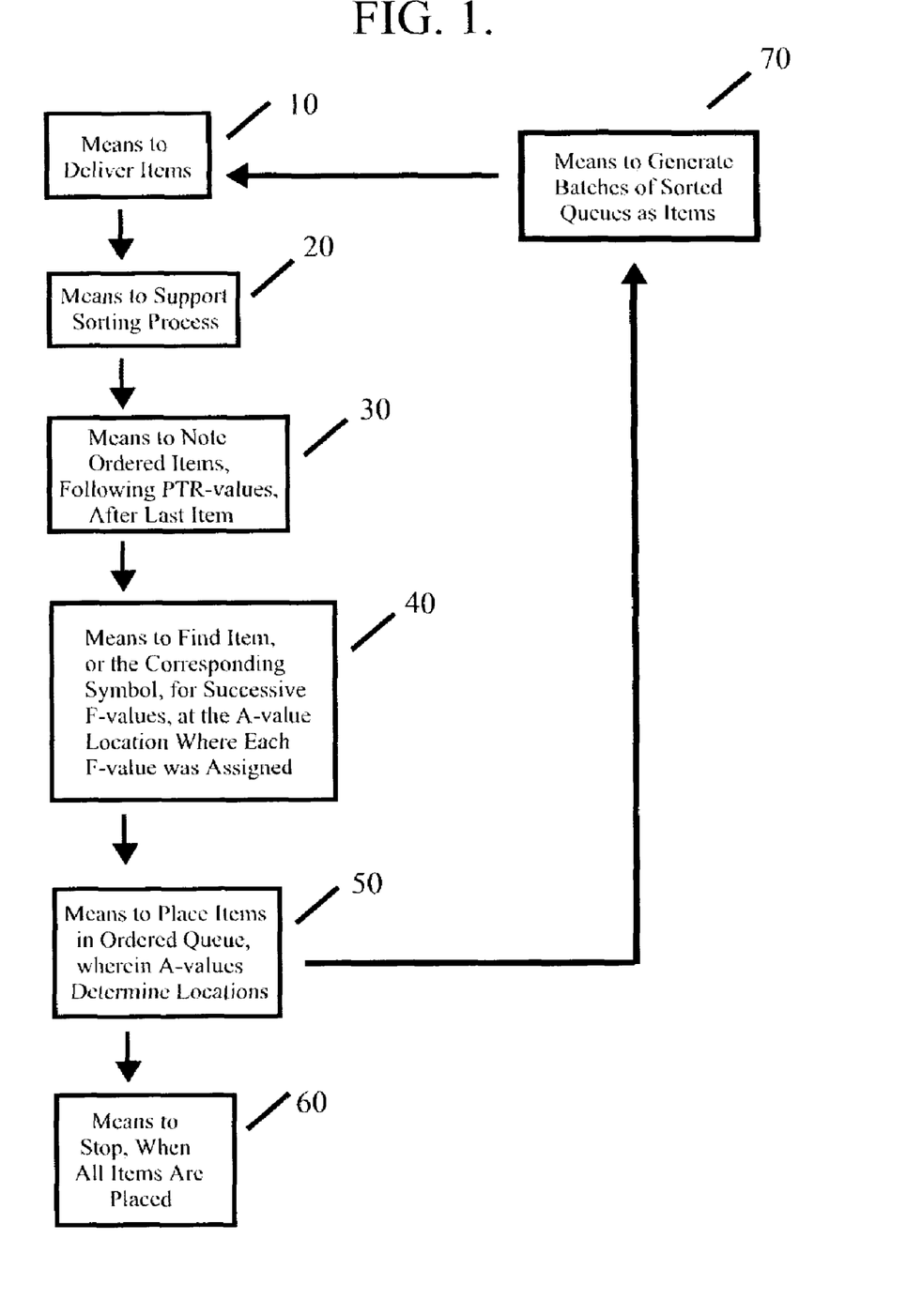
FIG. 1 shows a simplified flowchart illustration of the overall architecture of the inventive method in a preferred embodiment of steps executed as a software machine, operably coupled with a preferred embodiment of steps executed as a method for sorting physical tokens or articles by apparatus (the steps all being operative in accordance with preferred embodiments of the present invention).

The reference numerals in FIG. 1 indicate the following components: 10=means to deliver plural items; 20=a sorting method that includes the inventive process (regardless of the particular embodiment of the elements) as detailed in FIG. 3; 30=means to note the order of sorted items by following PTR-values, after the last item is placed; 40=means to find an item or a symbol that corresponds to the F-values assigned to an A-valued location; 50=means to place plural sorted items in an ordered queue; 60=means to detect the lack of any remaining items to be sorted and then to end the process; and 70=means to generate batches of sorted queues as items.

Figure 2:
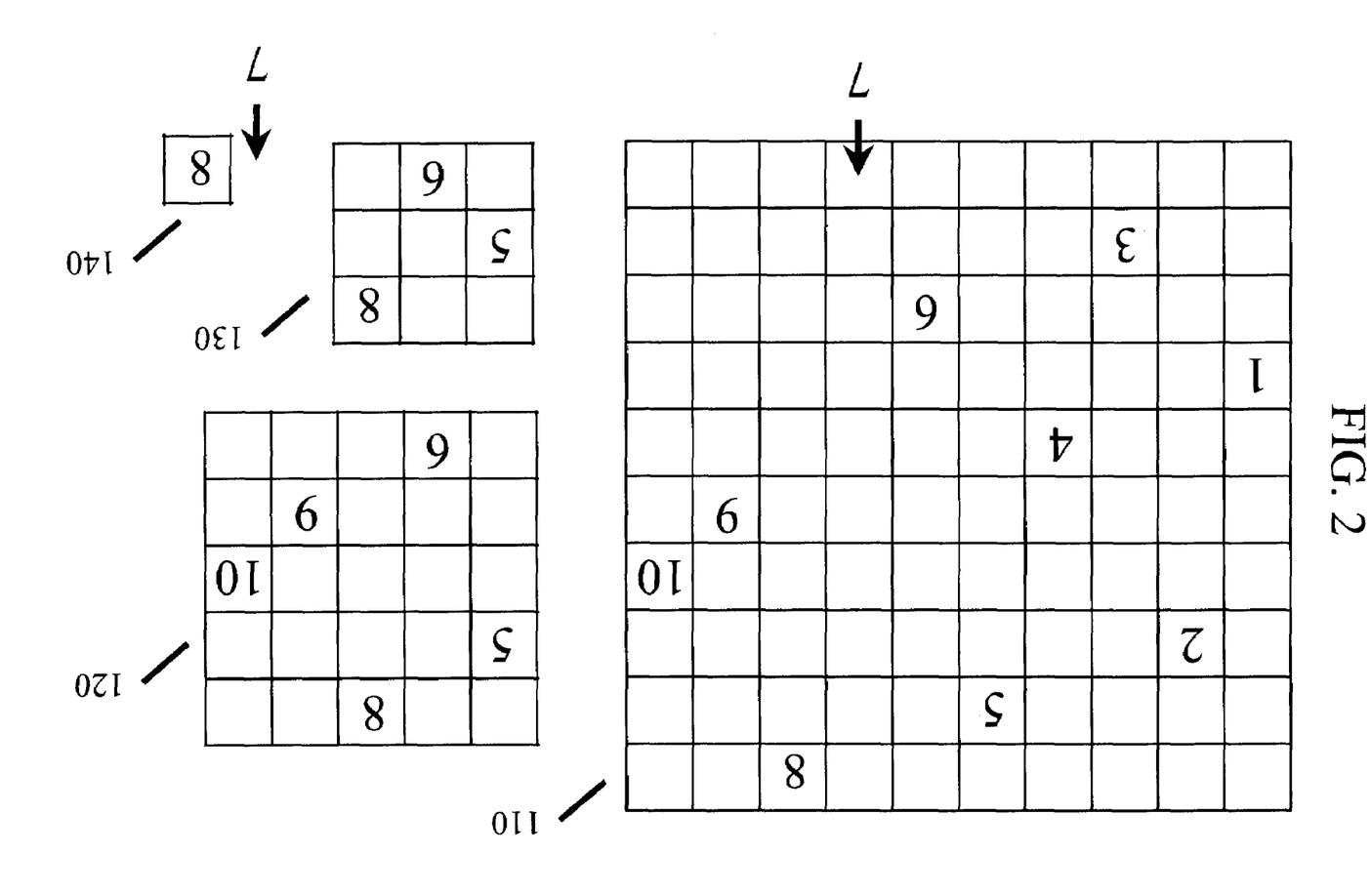
FIG. 2 illustrates the evolving abstract pattern of items being compared, in a hypothetical example of steps comprising the inventive method, regardless of the particular embodiment of the elements.

The reference numerals in FIG. 2 indicate the following components: 110=the spatial distribution status of items numbered "1" through "6" and "8" through "10" after the steps of the method were followed to determine their placement in a hypothetical distribution, showing the current selected item to be placed is numbered "7;" 120=the spatial distribution status of items numbered "5" through "6" and "8" through "10" after the steps of the method were followed to determine that the item numbered "4" was closest to the centroid in the spatial distribution of those already placed; 130=the spatial distribution status of items numbered "5" through "6" and "8" after the steps of the method were followed to determine that the item numbered "9" was the closest to the centroid in the spatial distribution of those already placed; and 140=the spatial distribution status of the item numbered "8" after the steps of the method were followed to determine that the item numbered "6" had the highest K-value of those closest to the centroid in the spatial distribution of those already placed, with the indication that the item numbered "7" will be placed to its left.

Figure 3:
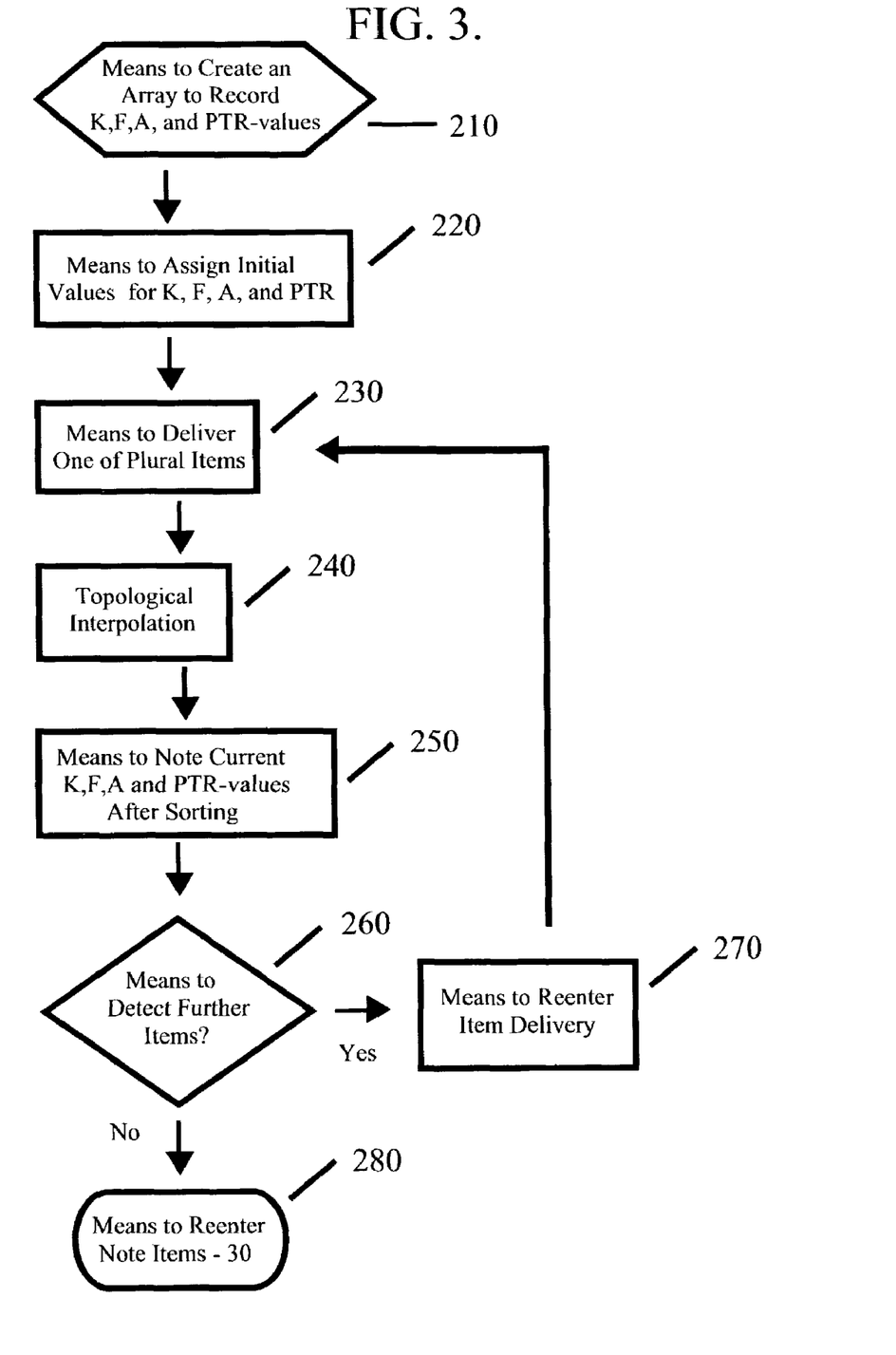
FIG. 3 shows a simplified flowchart illustration of the steps comprising the inventive method in a preferred embodiment of steps executed as a software machine operably coupled with a preferred embodiment of a process for sorting physical tokens or articles by apparatus (the steps being operative in accordance with preferred embodiments of the present invention).

The reference numerals in FIG. 3 indicate the following components: 210=means to create an array to record values; 220=means to assign initial values to K, F, A, and PTR; 230=means to deliver plural items; 240=means supporting "topological interpolation" as detailed in FIG. 4; 250=means to note current values of K, F, A, and PTR after the sorting is complete; 260=means to detect the presence of further items to be delivered; 270=means to recursively transfer control back to item delivery (10); and 280=means to transfer control back to the overall architecture (FIG. 1.) by noting the sorted item values (30).

Figure 4:
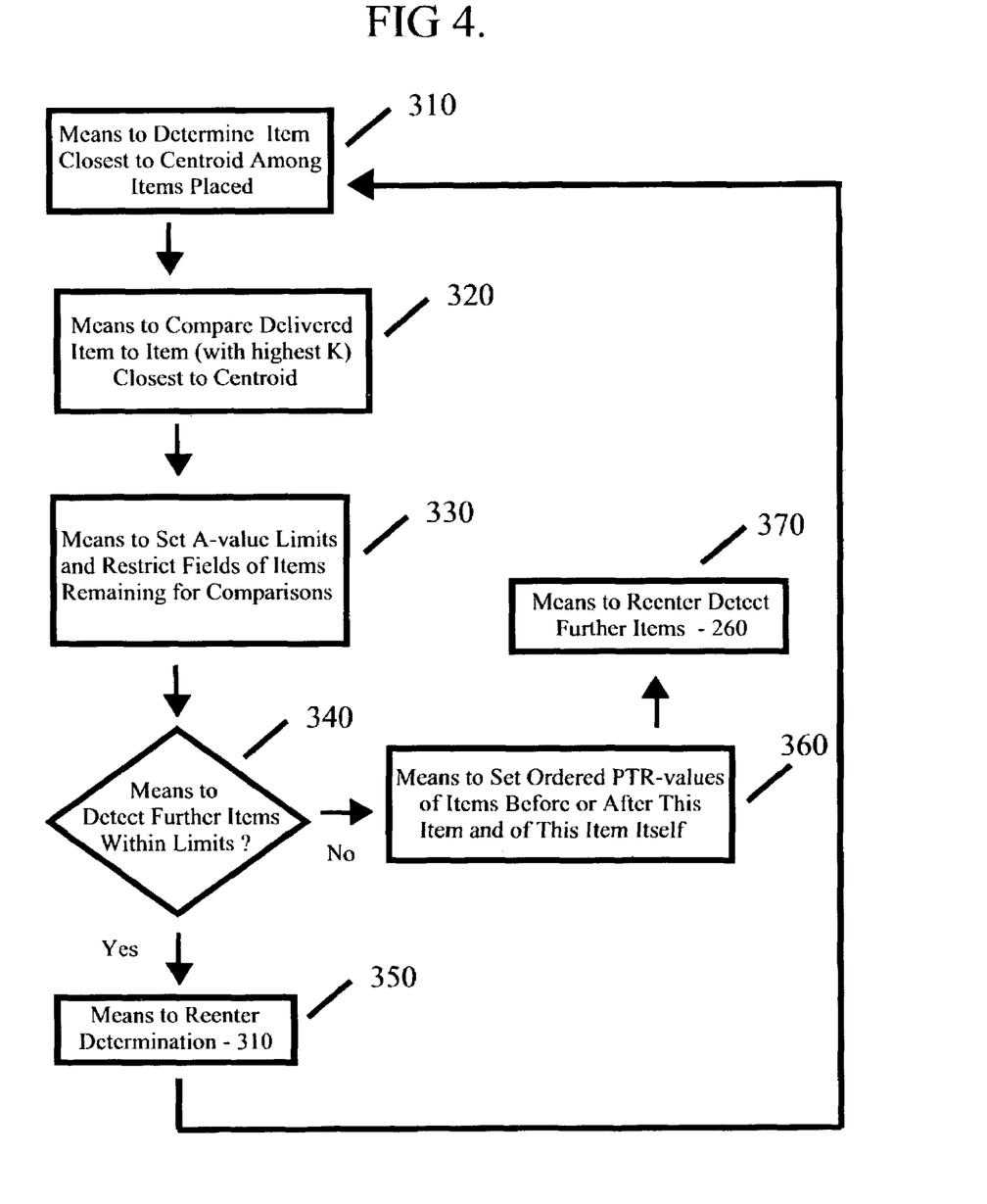
FIG. 4 shows a simplified flowchart illustration of the novel inventive process wherein the number of comparisons required for sorting items is reduced, herein described as "topological interpolation" as referenced in FIG. 3.

The reference numerals in FIG. 4 indicate the following components: 310=means to locate the item closest to said centroid in the spatial distribution of those items already placed; 320=means to compare delivered items to item located by 310; 330=means to set A-value limits and restrict fields of items remaining for comparisons; 340=means to detect the presence of further items within established limits; 350=means to recursively transfer control back to 310; 360=means to set ordered PTR-values of items before or after this item and of this item itself; and 370=means to recursively transfer control back to 260.

DESCRIPTION

Definitions

As employed throughout the disclosure, the following terms, unless otherwise indicated, shall be understood to have the following meanings:

"Executing" steps consists of: following a sequenced list of steps; testing in turn the validity of conditions described therein; implementing the directions contained in the current step when said conditions are found to be valid; and when there are no conditions therein or when said conditions are found to be invalid, transferring control to the next step.

A "round" consists of any valid sequence of steps executed before returning to step c.

A "link" or "linking" each address to the address that follows refers to assigning values for pointers (PTR-values) to addresses that indicate which next address to look up in a sequenced series of such look-ups.

To "note" or "noting" refers to changes of record made contingent upon the plural values encountered.

"Operably coupled" refers to a juxtaposition wherein the components so described are in a relationship permitting them to function in their intended manner.

Introduction

A method for following a sequence of conditionally contingent steps results in items being sorted according to their respective ordinal ranks is provided.

A means to deliver items to a sorting process is provided.

A means to create an array, wherein value(s) of plural role-defined variables are recorded, is provided and a means to assign initial values to parameters used to index items according to the inventive method is provided.

A means to sequence the indices corresponding to each item in said array is provided.

A means to calculate a most central point among items already placed (a "centroid") in said array is provided.

A means to locate the item closest to said centroid in said array is provided.

A means to compare an ordinal rank of the most recently delivered item to that of said item closest to said centroid in said array is provided.

A means to restrict further searches in said array for subsequent comparisons is provided.

A means to detect whether or not there are remaining items for subsequent comparisons in the search-space so restricted is provided.

A means is provided to change, according to the steps of the inventive method described herein, the values of said parameters used to index items.

A means is provided to record the changed values of said parameters used to index items according to the inventive method.

A means to detect whether or not there are remaining items delivered is provided.

A means is provided to note the record of said changed values of said parameters used to index items according to the inventive method.

A means is provided to locate items that correspond to said changed values of said parameters used to index items according to the inventive method.

A means is provided to position items according to their ordinal ranks, in plural sorted queues.

A means is provided to deliver plural batches of sorted queues of items.

A means is provided to generate means to deliver items from said batches of sorted queues of items.

A means is provided to detect whether or not there are remaining batches of sorted queues of items to be further sorted.

A means is provided to end the process when there are no further items delivered.

To sort items according to the inventive process, execute in their given sequence the following numbered steps (infra).

Steps:
a) Create an array from plural dimensions (e.g., a two dimensional or 2-D array) of size R (where R=a number of recordings equal to the number of items delivered) for recording plural K-axis values (representing the order in which items are delivered), plural F-values (values assigned to describe individual item parameters that distinguish the ordinal ranks of delivered items, one from another), plural A-values (representing the addresses associated with items), and plural pointers or PTR-values (indicating which address follows in sequence the address containing a PTR-value). To each address, a pointer is attached that indicates the next address to consult (thus establishing a "link" or "linking" each address to the address that will follow) in a sequential series of consultations;

b) Initialize K-value and F-value variables to null, designate a unique address as an origin location, and initialize the PTR-value of the origin location to null;

c) Deliver a new item to the sorting process;

d) Determine the item closest to a coordinate position most central in the spatial distribution of those already placed among those items remaining for the current round, by first dividing the highest K-value by 2 and taking the result as A-axis and K-axis coordinate values of said centroid and then following the pointers of those addresses already assigned F-values (corresponding to delivered items), and concurrently counting each link, beginning with one (that is, count=1); once the count total equals or exceeds the A-axis coordinate value of said centroid, the A-axis value of the address so indicated will either equal or immediately follow the A-axis coordinate value of said centroid. If the total number of items already placed is odd, said centroid will rest coincident with an address that an item could occupy (thereby making an item assigned to that address the one closest to the centroid); if the total number of items is even, said centroid will rest at an intersection between items. In this latter case, identify the values closest to said A-axis and K-axis coordinate values of said centroid by adding the values of the A-distance and the K-distance from said centroid of the items associated with A-axis and K-axis values immediately before and after, or equal to, the coordinate values lying on each axis of said array; the plural items closest to the centroid will be those assigned plural addresses yielding the smallest sum of A-distance(s) and K-distance(s) so measured;

e) If two or more items already placed are equivalently closest to said centroid, then treat the one with the highest associated K-value as the item closest to the centroid;

f) Compare the new item to said item closest to the centroid;

g) Follow the PTR-values of those addresses already assigned F-values corresponding to delivered items, while concurrently counting each link beginning with one (that is, count=1). Once the count total includes the address of the item now compared, set the A-value thus established of the item now compared as a new A-value limit (whether a highest or lowest A-value limit) for the current round, according to the direction opposite the result of the comparison (that is, set the A-value of the item now compared as a new lowest A-value limit if the most recently delivered item has an ordinal rank higher than the one closest to the centroid or set the A-value of the item now compared as a new highest A-value limit if the most recently delivered item has an ordinal rank lower than the one closest to the centroid). The lowest of these limits will be a temporary origin address for further determinations of centroids during the remaining steps in the current round. The highest of these limits will mark where to start and stop considering sequential addresses for further determinations of centroids during the current round;

h) Restrict the field of items remaining for comparison to those still within the bounds of plural established limits and then collapse said array to accommodate only those already placed items that remain with A-values higher than the most recent lowest A-value limit and with A-values lower than the most recent highest A-value limit for the current round, while every remaining A-axis value and every remaining K-axis value i) is assigned in coordinate pairs to a distinct item among those still within said bounds and while the respective relative ordinal positions of the K-values remain the same;

j) If there are no further items still within the bounds of plural established limits and the new item is higher than the last item compared, set the pointer of the last item compared to the address of the new item and set the pointer of the new item to the address of the item (if one exists) previously pointed to by the last item compared. If the new item is lower than the last item compared, set the pointer of the new item to the address of the last item compared and set the pointer of the item previously pointing to the item last compared (if one exists) to the address of the new item. Then return to step (c);

k) Return to (d);

l) When there are no further items to deliver, note the F-values from their assigned P-value locations in the order indicated by first noting the F-value assigned to the P-value location pointed to by the pointer now found in the origin location and then following the order indicated by the pointers found in the location of each subsequent F-value that is noted. Since, these F-values will be in the sorted order, end the process; and m) Return to (c).

The inventive method disclosed thus far has been described without reference to specific hardware or software, instead the inventive method has been described in such a manner that those skilled in the art can readily adapt such hardware and software as may be available or preferable.

Although the present invention has been described in considerable detail with reference to certain preferred versions thereof, other versions are possible.

For example, according to another embodiment of the present invention, a method or process is disclosed, wherein an n-dimensional (n-D) array is created, whereby the search among plural n-D coordinate positions, most central to each of plural planar spatial arrays therein, is reduced by a collapse of space or of temporal contingencies analogous to that described in claim 1, thereby facilitating the final disposition of plural items arranged in a predetermined order according to plural parameters.

According to this embodiment, plural criteria for sorting items is assigned to each of n-dimensions.

Each of said plural criteria for sorting items is assigned its own higher-level ordinal rank among said plural criteria.

While items are sorted within each criterion, the remaining criteria associated with each item are themselves sorted.

While items are placed according to the inventive process as applied to each of plural spatial arrays (representing the order of item selection mapped to the order of the local sorting principle), the arrays are likewise mapped according to the mapping of the order of item selection to the order of plural supraordinate sorting principles, thereby reducing the steps required to achieve a desired outcome.

According to another example of the present invention, a method or process is disclosed, wherein means for indexing and moving physical tokens, according to the sorted order of items arranged by the inventive process, are added.

According to this embodiment, the inventive process is operably coupled with means to index and move items, whereby plural physical tokens are sorted in ordinary space.

Coupling may be embodied as a manual process of tagging items and registering indices, as an automated process of tagging items and registering indices, or as a computer system that tags items and registers indices or as any equivalent means.

Items can be conveyed from plural conduits (e.g., transportation or conveyors moving physical tokens) or virtual items can be sorted according to the inventive process in order to direct the subsequent movement of physical tokens in space.

According to another example of the present invention, a method or process is disclosed, wherein codes are sorted that represent customized rules for prioritizing items.

According to this embodiment, the items to be sorted are codes that correspond to some predetermined rules for prioritizing the ordinal ranks of those items.

The sorted codes may be used to select a sequence of operations (e.g., guiding the placement of interconnected components comprising circuit design, sequencing a series of steps to be included in software design, or routing signals in a complex network).

According to another example of the present invention, a method or process is disclosed, wherein the positioning of an item can be underway while the search for the position of the next item is initiated.

According to this embodiment, means are included to support separate pathways that enable the relative positioning of one of plural items while the determination of the relative position of the next item is already underway, whereby idle areas in the search space (with respect to one path of comparisons) are employed via parallel processing for another path of comparisons (not engaged by the first path); thereby allowing parallel processing in a distinct section of the whole problem space.

When plural sequentially ordered items are routed to adjacent regions of space, the final position of one may be contingent on the final placement of the other.

Under such conditions, the return value of the item placed earlier need not propagate all the way to the root of the search tree.

According to another example of the present invention, a method or process is disclosed, wherein items are delivered by a distributed network of systems and/or positioned in sorted order in a distributed network of systems.

According to this embodiment, items can be conveyed from plural conduits (whether transportation or conveyors moving physical tokens or pathways transmitting virtual items), wherein the items to be sorted are objects in distributed networks or represent the objects therein, thereby enabling the sorting process to be non-local (both geographically and in terms of distributed network nodes) and discontinuous (both in terms of space and time).

In most embodiments of the present invention, it will be advantageous to integrate and operably couple the inventive process with a computer and associated control programs, thereby enabling the control of other components of a system via the present invention.

This integration can be accomplished with a computer system and software machine architecturally configured as disclosed herein.

According to this embodiment, plural items to be sorted are represented by electronic data entered as input to the computer and then delivered to the sorting process (FIG. 3).

Once the data are sorted, the array (210) that notes (250) the order of the sorted items is operably coupled with the larger system (FIG. 1).

According to another example of the present invention, a computer system or software machine is disclosed wherein the steps of the inventive process are implemented in circuitry, for example in an integrated circuit.

According to this embodiment, a flow of signals through physical channels represents the instructions comprising the inventive process.

The execution of the instructions is enacted as a function of the contingent interdependencies of signals and the changes effected in the channels, thereby sorting items.

According to another example of the present invention, a computer system and software machine is disclosed, wherein plural sorted items are listed (50) in sorted order for the purpose of efficiently comparing a list to other lists, wherein the items sorted are used to order the sequencing of steps in some other method or process.

According to this embodiment, plural items to be sorted are represented by electronic data that are entered as input to the computer and delivered to the sorting process (FIG. 3).

Once the data are sorted, the array (210) that notes (250) the order of the sorted items is operably coupled (30) with the larger system (FIG. 1).

Once the sorted items are placed in a queue (50), the queued items can be delivered as sorted batches of items (70) to be compared with other queued items (from additional sorting processes).

By comparing such sorted lists, a search for corresponding items contained in both lists is thereby rendered more efficient.

The results of such correlated items (10) can be thereby used to order the sequencing of steps in some other method or process.

According to another example of the present invention, a computer system and software machine is disclosed, wherein data, addresses, instructions, or pathways are the items delivered (10).

According to this embodiment, plural items to be sorted are represented by electronic data that are entered as input to the computer and delivered (10) to the sorting process (FIG. 3).

Once the data are sorted, said array (210) that notes (250) the order of the sorted items is operably coupled (30) with the larger system (FIG. 1).

Once the sorted items are placed in said queue (50), the queued items can be delivered as sorted batches of items (70).

The means for delivering items (10) generated (70) from such a queue (50) of sorted items can be thereby used to direct the steps in some other method or process, according to the role of the data (e.g., whether a record to be processed, an address to be read or written, an instruction to be executed, or a pathway to be followed).

According to another example of the present invention, a computer system and software machine is disclosed, wherein the data to be sorted correspond to objects in distributed networks, thereby enabling the sorting process to be non-local (both geographically and in terms of distributed network nodes) and discontinuous (both in terms of space and time).

According to this embodiment, one or more elements, selected from the group consisting of said means for delivering items (10); the sorted queues generated by said means to place items (50); said batches of items delivered by said means (70); and is embodied within a distributed network of systems.

A server can contain said means for delivering items (10), sort the items, and deliver the batch of sorted items (70) to said network (e.g., the Internet, the World Wide Web, an intranet, an extranet, an ATM network, computer clusters, or some other networked system).

A client can download said means for delivering items (10) from far-flung nodes comprising said network and commence a sorting process within said client.

A workstation can download said means for delivering items (10) from a network, generate plural sorted queues of items, and generate (70) batches of sorted items to be delivered back (10) to said distributed network of systems.

According to another example of the present invention, a computer system and software machine is disclosed wherein the data sorted correspond to objects in virtual worlds, thereby enabling the rendering of digital images with greater depth and realism or intelligibility.

According to this embodiment, the items to be sorted can be codes that correspond to some predetermined rules for prioritizing the ordinal ranks of plural graphical items.

The sorted codes can be used to track the time-contingent relative positions of said graphical items through a coordinate space representing ordinary space or more exotic spaces.

Rules that determine the precedence of visibility for overlapping graphical objects thereby will facilitate the automated animation of complex scenes and complex sequences of motion therein.

According to another example of the present invention, a computer system and software machine is disclosed, wherein sorting processes are performed that incorporate data, addresses, instructions, or pathways.

According to this embodiment, the items to be sorted can be codes that correspond to some predetermined rules for prioritizing the ordinal ranks of plural data, addresses, instructions, or pathways, whereby electronic data, the addresses for the data, software instructions, or pathways for the exchange of signals or data in a multi-purpose computer can be rearranged for consequent action that leads to useful and tangible outcomes.

According to another example of the present invention, a computer system and software machine is disclosed, wherein the items sorted are interpreted as critical features for pattern detection, or alternatively as a pattern to be classified, thereby initiating a call for consequent action that leads to useful and tangible outcomes.

According to this embodiment, the items to be sorted can be codes that correspond to some predetermined rules for prioritizing the ordinal ranks of plural critical features indicating patterns that are detected or patterns to be classified.

The sorted codes can be used to sequence calls for plural consequent actions that lead to useful and tangible outcomes.

According to another example of the present invention, a computer system and software machine is disclosed, wherein the dynamic flow of information in a changing environment is managed through real-time prioritizing decisions resulting from applying the inventive methods to the sorting of priority codes.

According to this embodiment, a flow or stream of information representing rapidly changing states in a dynamic system contains items to be sorted, thereby enabling decisions made in real-time in order to control the components of a complex and dynamic system via the present invention.

According to another example of the present invention, a computer system and software machine is disclosed, wherein data are laid down in a storage medium, according to real-time sorting processes, by applying the inventive method to minimize retrieval times for revised and consequently fragmented data by optimizing the placement of said revised and fragmented data via a sorting of the remaining vacant storage spaces.

According to this embodiment, data, as it is accumulated, is arranged according to ongoing real-time sorting processes, thereby obviating the need to defragment the spatial distribution of stored data.

The items to be sorted represent a flow or stream of information from continually revised states in a storage medium, thereby enabling decisions made in real-time in order to optimize the placement of said revised and otherwise fragmented data via a sorting of the locations of remaining vacant storage spaces.

According to another example of the present invention, wherein the sorted items result in a list of queued instructions then operably coupled with means to control plural additional apparatuses or systems.

According to this embodiment, the items sorted represent instructions that are ordered to provide a sequence of operations to be carried out by an apparatus or system.

According to another example of the present invention, a computer system and software machine is disclosed, wherein the original sequential order of input items becomes a key later sorted to reassemble the transmitted order of items after they have been routed through distributed networks.

According to this embodiment, a code that represents the order in which items are input marks each item (e.g., a packet of data transmitted over a network) routed according to expedient decision rules and received at the destination in a shuffled sequence.

The inventive process can then sort the packets, thereby reconstructing the original message.

It is appreciated that various features of the invention which are, for clarity, described in the context of separate embodiments may also be provided in combination in a single embodiment.

Conversely, various features of the invention which are, for brevity, described in the context of a single embodiment may also be provided separately or in any suitable sub combination.

While the description above contains many specificities, these should not be construed as limitations on the scope of the invention to what has been particularly shown and described hereinabove, but rather as an exemplification of one preferred embodiment and additional embodiments thereof.

Therefore, the spirit and scope of the appended claims should not be limited to the description of the preferred versions contained herein.

What is claimed is:

1. A reduced comparison coordinate-value sorting method of generating a sorted data structure, by executing topological interpolation, comprising:
   a) creating an array;
   b) delivering a new item to said array;
   c) determining a reference item closest to a centroid in said array within any determined A-value limits;
   d) deciding an ordinal rank of said new item compared to that of said reference item;
   e) if the ordinal rank of said new item is unequal to that of said reference item, setting the A-value of a limiting item as a new A-value limit for the current round, according to the direction opposite the result of the comparison and if the ordinal rank of said new item is equal to that of said reference item, then setting the A-value of said reference item as a new A-value limit for the current round;
   f) restricting the field of items remaining for comparison, by collapsing said array to accommodate only those already placed items that remain within the bounds of any A-value limits;
   g) if no A-value limits are yet established and in the alternative until there are no further items within the bounds of any established A-value limits, returning to step (c)-(g);

h) if a pointer of the last compared limiting item points to a linked item in said array and when the new item has an ordinal rank higher than that of i) the last compared limiting item, setting a pointer of that limiting item to the address of said new item in said array and setting a pointer of said new item to the address of the linked item in said array and if a pointer of a linked item in said array points to the address of the last compared limiting item in said array and when the new item has an ordinal rank lower than the last compared limiting item, setting a pointer of the new item to the address of the last compared limiting item in said array and then setting the pointer of the linked item previously pointing to the last compared limiting item to the address of the new item in said array and if a pointer of a linked item in said array points to the address of the last compared limiting item in said array and when the new item has an ordinal rank equal to the last compared limiting item, setting a pointer of the new item and a pointer of the last compared limiting item so that any linked item previously pointing to the last compared limiting item now points to the address of an origin in said array for at least one path of pointers through said array and between the new item and the last compared limiting item, and so that the pointer of an item that exits the path points to the address of any linked item in said array previously pointed to by the last compared limiting item; and j) until there are no further items delivered, returning to step (b)-(i), and then noting any F-values from their assigned A-value locations by first noting the F-value assigned to the A-value location indicated by the pointer of any linked item that points to an origin item and following the order indicated by the pointer of any item found in the A-value location of each F-value so noted and noting any subsequent F-value so indicated, thereby providing a sorted data structure;

k) storing said sorted data structure in a computer readable medium.

2. The reduced comparison coordinate value sorting method of generating a sorted data structure by executing topological interpolation in claim 1, wherein an n-D array is created, whereby a search for coordinate positions closest to the centroid of each of plural arrays therein, is reduced by a collapse of space, thereby facilitating the final disposition of plural items sorted into a predetermined order.

3. The reduced comparison coordinate value sorting method of generating a sorted data structure by executing topological interpolation in claim 1, wherein means for indexing and moving plural physical tokens is added, whereby plural physical tokens are sorted in ordinary space.

4. The reduced comparison coordinate value sorting method of generating a sorted data structure by executing topological interpolation in claim 1, wherein plural codes are sorted that themselves represent some specially defined rules for prioritizing the ordering of plural items, whereby the sorting process enables the control of plural other sorting processes.

5. The reduced comparison coordinate value sorting method of generating a sorted data structure by executing topological interpolation in claim 1, wherein the positioning of one of plural items can be underway while the search for the position of the next item is initiated, whereby idle areas in the search space, with respect to one path of comparisons, are employed via parallel processing for another path of comparisons, not engaged by the first path; thereby allowing parallel processing in a distinct section of the whole problem space.

6. The reduced comparison coordinate value sorting method of generating a sorted data structure by executing topological interpolation in claim 1, wherein one or more elements, selected from the group consisting of:

a means to deliver items;

sorted data structures generated by a means to place plural items in an ordered data structure;

batches of items delivered by a means to generate batches of sorted data structures as items; and is embodied within a distributed network of systems, whereby the sorting process can be non-local, both geographically and in terms of distributed network nodes, and discontinuous, both in terms of space and time.

7. A computer-based system comprising: a processor, a memory comprising executable instructions for generating a sorted data structure by executing a reduced comparison coordinate-value sorting method employing topological interpolation, a computer-readable medium, thereby enabling a computer-based system for a sorting process comprising:

a) creating an array;

b) delivering a new item to said array;

c) determining a reference item closest to a centroid in said array within any determined A-value limits;

d) deciding an ordinal rank of said new item compared to that of said reference item;

e) if the ordinal rank of said new item is unequal to that of said reference item, setting the A-value of a limiting item as a new A-value limit for the current round, according to the direction opposite the result of the comparison and if the ordinal rank of said new item is equal to that of said reference item, then setting the A-value of said reference item as a new A-value limit for the current round;

f) restricting the field of items remaining for comparison, by collapsing said array to accommodate only those already placed items that remain within the bounds of any A-value limits;

g) if no A-value limits are yet established and in the alternative until there are no further items within the bounds of any established A-value limits, returning to step (c)-(g);

h) if a pointer of the last compared limiting item points to a linked item in said array and when the new item has an ordinal rank higher than that of the last compared limiting item, setting a pointer of that limiting item to the address of said new item in said array and setting a pointer of said new item to the address of the linked item in said array and if a pointer of a linked item in said array points to the address of the last compared limiting item in said array and when the new item has an ordinal rank lower than the last compared limiting item, setting a pointer of the new item to the address of the last compared limiting item in said array and then setting the pointer of the linked item previously pointing to the last compared limiting item to the address of the new item in said array and if a pointer of a linked item in said array points to the address of the last compared limiting item in said array and when the new item has an ordinal rank equal to the last compared limiting item, setting a pointer of the new item and a pointer of the last compared limiting item so that any linked item previously pointing to the last compared limiting item now points to the address of an origin in said array for at least one path of pointers through said array and between the new item and the last compared limiting item, and so that the pointer of an item that exits the path points to the address of any linked item in said array previously pointed to by the last compared limiting item; and i) until there are no further items delivered, returning to step (b)-(i), and then noting any F-values from their assigned A-value locations by first noting the F-value assigned to the A-value location indicated by the pointer of any linked j) item that points to an origin item and following the order indicated by the pointer of any item found in the A-value location of each F-value so noted and noting any subsequent F-value so indicated, thereby providing a sorted data structure;

k) storing said sorted data structure in a computer readable medium; when executed by said processor.

8. The computer-based system in claim 7, embodied in circuitry.

9. The computer-based system in claim 7, wherein the items sorted are in order for the purpose of comparing said order to other ordered data structures.

10. The computer-based system in claim 7, wherein the items sorted are used to order steps in at least one method or process.

11. The computer-based system in claim 10, wherein the items sorted correspond to objects in distributed networks such as the Internet, computer clusters, the World Wide Web, or other intranet and extranet systems, thereby enabling feedback information resulting from any search process to guide the prioritized reordering of the remaining search spaces so the speed of any search process made is increased.

12. The computer-based system in claim 10, wherein the items sorted correspond to objects in virtual worlds, thereby enabling the rendering of digital images with multiple planes representing depth of field and corresponding verisimilitude.

13. The computer-based system in claim 7, wherein electronic data, the addresses for such data, software instructions, or the pathways for the exchange of signals or data in a multi-purpose computer are the items sorted.

14. The computer-based system in claim 7, wherein the efficiency of computer clusters is optimized by sorting the output from plural computing nodes as delegated subtasks are completed and passed back to the network, whereby, when idle computing nodes become available for further processing they are delegated new tasks and then assigned tasks are reassembled in sorted order to complete a distributed task.

15. The computer-based system in claim 7, wherein sorting processes are performed that incorporate electronic data, the addresses for such data, software instructions, or the pathways for the exchange of signals or data from distributed networks such as the Internet, computer clusters, the World Wide Web, or other intranet and extranet systems.

16. The computer-based system in claim 7, wherein the sorting processes are used to verify patterns encountered as a call, invoked by relevance to concurrent conditions, for some consequent action that leads to useful and tangible outcomes.

17. The computer-based system in claim 7, wherein the dynamic flow of information in a changing environment is managed through real-time prioritizing decisions resulting from using the instant inventive methods for sorting priority codes to guide said decisions.

18. The computer-based system in claim 7, wherein data, as it is accumulated, is arranged according to ongoing real-time sorting processes, thereby obviating the need to defragment a spatial distribution of stored data.

19. The computer-based system in claim 7, wherein the sorted items are used to prioritize instructions in at least one other apparatus or system.

20. The computer-based system in claim 7, wherein a sequential order of input items becomes a key used to route sorted items through distributed networks such as the Internet, computer clusters, the World Wide Web, or other intranet and extranet systems, thereby mapping nodes according to optimizing criteria.

* * * * *